(12) United States Patent
Faßbender et al.

(10) Patent No.: US 11,352,043 B2
(45) Date of Patent: Jun. 7, 2022

(54) TILTING MECHANISM INTEGRATED IN THE STEERING WHEEL RIM

(71) Applicant: Ford Global Technologies, LLC, Dearborn, MI (US)

(72) Inventors: Martin Faßbender, Buschhoven (DE); Philipp Kuepper, Grevenbroich (DE); Klemens Degle, Cologne (DE); Bruno Alves, Huerth (DE); Thomas Kreuz, Mechernich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/469,061

(22) Filed: Sep. 8, 2021

(65) Prior Publication Data

US 2022/0073123 A1  Mar. 10, 2022

(30) Foreign Application Priority Data

Sep. 10, 2020 (DE) .......................... 102020211388.2

(51) Int. Cl.
*B62D 1/04* (2006.01)
*B62D 1/08* (2006.01)
*B62D 1/06* (2006.01)

(52) U.S. Cl.
CPC ................. *B62D 1/08* (2013.01); *B62D 1/06* (2013.01)

(58) Field of Classification Search
CPC ... B62D 1/06; B62D 1/08; B62D 1/10; B62D 1/183; B62D 1/184
See application file for complete search history.

(56) References Cited

U.S. PATENT DOCUMENTS

| 1,147,030 | A | * | 7/1915 | Lobdell et al. | B62D 1/10 74/555 |
| 1,204,724 | A | * | 11/1916 | Whte et al. | B62D 1/10 74/555 |
| 1,247,734 | A | * | 11/1917 | Smith | B62D 1/10 74/555 |
| 1,259,182 | A | * | 3/1918 | White | B62D 1/10 74/555 |
| 1,272,582 | A | * | 7/1918 | Vincent | B62D 1/10 74/555 |
| 1,285,737 | A | * | 11/1918 | Kissling | B62D 1/10 74/555 |

(Continued)

FOREIGN PATENT DOCUMENTS

| CN | 111497924 B | * | 9/2020 |
| DE | 1916652 U | | 5/1965 |

(Continued)

*Primary Examiner* — Adam D Rogers
(74) *Attorney, Agent, or Firm* — Vichit Chea; Price Heneveld LLP

(57) ABSTRACT

A steering wheel for a transport vehicle comprises a hub and a rim which extends around the hub, wherein the rim is pivotably supported between a steering position and at least one non-steering position about a tilting axis. The steering wheel has at least one releasable locking arrangement having a hub-side hub locking device and a rim-side rim locking device for blocking the pivoting by use of mutual engagement. The hub locking device and the rim locking device are configured to engage with each other with spacing from the tilting axis.

10 Claims, 3 Drawing Sheets

(56) References Cited

U.S. PATENT DOCUMENTS

| | | | | |
|---|---|---|---|---|
| 1,315,261 | A * | 9/1919 | Vincent | B62D 1/10 74/556 |
| 1,374,830 | A * | 4/1921 | Davis | B62D 1/10 74/555 |
| 1,438,005 | A * | 12/1922 | Vincent | B62D 1/08 74/555 |
| 1,484,892 | A * | 2/1924 | Lobdell | B62D 1/08 74/555 |
| 1,621,206 | A | 3/1927 | Kacziba | |
| 3,691,866 | A * | 9/1972 | Berkes | B62D 1/184 16/334 |
| 5,794,468 | A | 8/1998 | Leung | |
| 6,389,858 | B1 | 5/2002 | Lee | |
| 11,072,359 | B2 | 7/2021 | Murray et al. | |
| 11,180,177 | B1 * | 11/2021 | Aktas | B62D 1/06 |
| 11,230,315 | B2 * | 1/2022 | Kastelic | B62D 1/10 |
| 2019/0308655 | A1 * | 10/2019 | Ochi | B62D 1/10 |

FOREIGN PATENT DOCUMENTS

| | | | | |
|---|---|---|---|---|
| DE | 69708735 | T2 | 7/2002 | |
| DE | 102019133221 | A1 | 6/2020 | |
| DE | 102020107156 | A1 | 9/2021 | |
| FR | 3108884 | A1 * | 10/2021 | |
| WO | 2018060443 | A1 | 4/2018 | |
| WO | WO-2018109039 | A1 * | 6/2018 | ............... B62D 1/10 |
| WO | WO-2021205039 | A1 * | 10/2021 | |

\* cited by examiner

TILTING MECHANISM INTEGRATED IN THE STEERING WHEEL RIM

CROSS-REFERENCE TO RELATED APPLICATION

This application claims foreign priority benefits under 35 U.S.C. § 119(a)-(d) to German Application No. 102020211388.2 filed Sep. 10, 2020, which is hereby incorporated by reference in its entirety.

FIELD OF THE DISCLOSURE

The present disclosure generally relates to a steering wheel for a vehicle, and more particularly, relates to a tiltable steering wheel.

BACKGROUND OF THE DISCLOSURE

Vehicle steering systems which have a mechanical tilting system are generally known and typically have a tilting mechanism for the steering wheel. In order to provide freedom of movement for the driver in situations in which he or she does not require the steering wheel, the steering wheel as a whole typically can be tilted away. When it is safe to do so, this may be advantageous, for example, during autonomous travel operation of the vehicle or when the vehicle is stopped.

It would be desirable to provide for a steering wheel having a tilting function which can be produced with a high degree of standard components and which can be securely fixed in several positions.

SUMMARY OF THE DISCLOSURE

According to a first aspect of the present disclosure, a steering wheel for a vehicle is provided. The steering wheel includes a hub, a rim which extends around the hub, wherein the rim is pivotably supported between a steering position and at least one non-steering position about a tilting axis, and at least one releasable locking arrangement having a hub-side hub locking device and a rim-side rim locking device for blocking the pivoting by mutual engagement, wherein the hub locking device and the rim locking device are configured to engage with each other with spacing from the tilting axis.

Embodiments of the first aspect of the disclosure can include any one or a combination of the following features:
  the movable components of the at least one releasable locking arrangement are arranged either only at a rim side or only at a hub side;
  the at least one releasable locking arrangement can be moved into a locking position and a release position, and wherein a pre-tensioning of the at least one releasable locking arrangement moves the at least one releasable locking arrangement into the locking position;
  the rim locking device can be changed in position relative to the tilting axis by rotating the rim about the tilting axis, while the hub locking device is fixed relative to the tilting axis;
  the tilting axis is orientated parallel with a plane which is defined by the rim;
  the steering wheel has two locking arrangements which are arranged in a substantially opposing manner with respect to the hub;
  at least one separation face, between the rim and the hub, wherein the at least one separation face extends substantially along an inner contour of the rim;
  the hub contains a hub center and at least one arm which extends from the hub center to the rim;
  the rim has a substantially circular closed shape;
  the at least one releasable locking arrangement has a seat and a locking pin for blocking by engaging the locking pin with the seat, and wherein the at least one releasable locking arrangement is configured to be released by moving the locking pin out of the seat;
  the seat and the locking pin are conically shaped for play-free locking;
  the locking arrangement has a plurality of sets of seats which define the steering position and the at least one non-steering position;
  a Bowden cable for releasing the locking arrangement by moving the locking pins, and a motor for activating the Bowden cable; and
  an activation mechanism which can be manually activated for releasing the at least one releasable locking arrangement and which has a plurality of activation handles which are substantially opposed with respect to the hub and which are activated substantially at the same time in order to release the at least one releasable locking arrangement.

According to a second aspect of the present disclosure, a steering wheel for a vehicle is provided. The steering wheel includes a hub, a rim which extends around the hub, wherein the rim is pivotably supported between a steering position and at least one non-steering position about a tilting axis, and at least one releasable locking arrangement having a hub-side hub locking device and a rim-side rim locking device for blocking the pivoting by mutual engagement, wherein the hub locking device and the rim locking device are configured to engage with each other with spacing from the tilting axis, wherein the locking arrangement can be moved into a locking position and a release position, wherein a pre-tensioning of the at least one releasable locking arrangement moves the at least one releasable locking arrangement into the locking position, and wherein the rim locking device can be changed in position relative to the tilting axis by rotating the rim about the tilting axis, while the hub locking device is fixed relative to the tilting axis.

Embodiments of the second aspect of the disclosure can include any one or a combination of the following features:
  the tilting axis is orientated parallel with a plane which is defined by the rim;
  the at least one releasable locking arrangement has a seat and a locking pin for blocking by engaging the locking pin with the seat, and wherein the at least one releasable locking arrangement is configured to be released by moving the locking pin out of the seat;
  the seat and the locking pin are conically shaped for play-free locking;
  a Bowden cable for releasing the locking arrangement by moving the locking pins, and a motor for activating the Bowden cable; and
  an activation mechanism which can be manually activated for releasing the at least one releasable locking arrangement and which has a plurality of activation handles which are substantially opposed with respect to the hub and which are activated substantially at the same time in order to release the at least one releasable locking arrangement.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
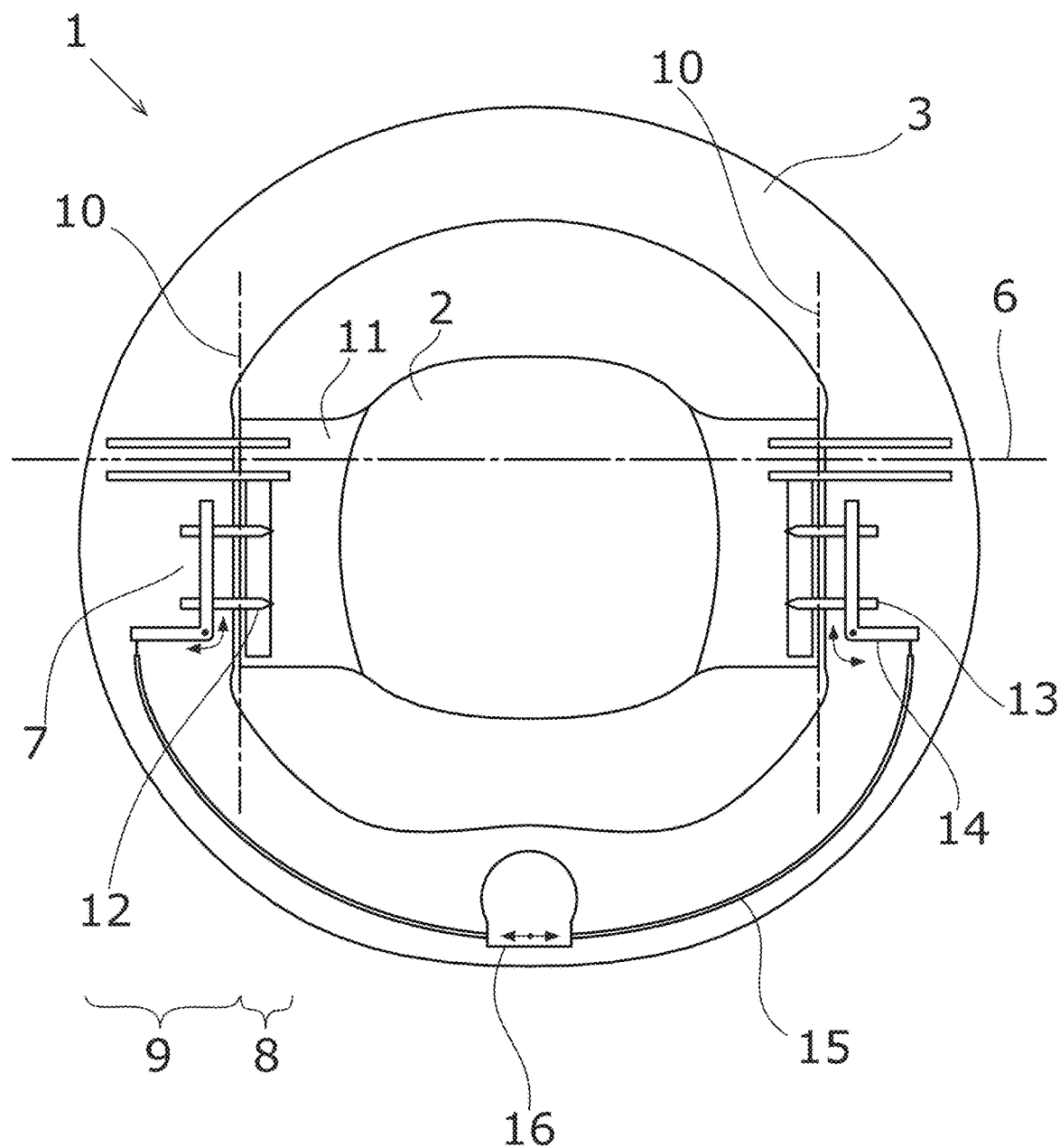
FIG. 1 is a schematic illustration of a vehicle steering wheel according to one embodiment with two locking arrangements for activation by use of Bowden cables and an electric motor.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle steering wheel having a tiltable mechanism integrated in the steering wheel rim. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

FIG. 1 shows a construction of a steering wheel 1 for use on a vehicle such as a wheeled vehicle, according to one embodiment. The steering wheel 1 includes a hub 2 with two arms 11 and a rim 3. The rim locking device 3 is located in the rim 3 and the hub locking device 9 is located in the arms 11 of the hub 2 which together form the locking arrangement 7. In this example, the rim locking device 8 may contain all movable components of the locking arrangement 7 such as the locking pins 13 and the lever mechanism 14. The lever mechanism 14 is capable, by rotating about a center of rotation, of pulling the locking pins 13 from their seats 12 and consequently releases the movement of the rim 3 about the tilting axis 6. Consequently, the locking arrangement 7 is released.

The separation faces 10 between the hub 2 and rim 3 can be seen in FIG. 1. In this embodiment, the lever mechanism 14 is moved by use of Bowden cables 15 which in turn are connected to a motor 16 which is configured as an electric motor. In order to block the movement, the locking pins 13 are subsequently pressed back into the seats 12 again by use of helical springs. Both the seats 12 and the locking pins 13 are configured in a conical manner in order to reduce the play. The electric motor may be controlled by use of buttons which are not shown in this instance.

Figure 2:
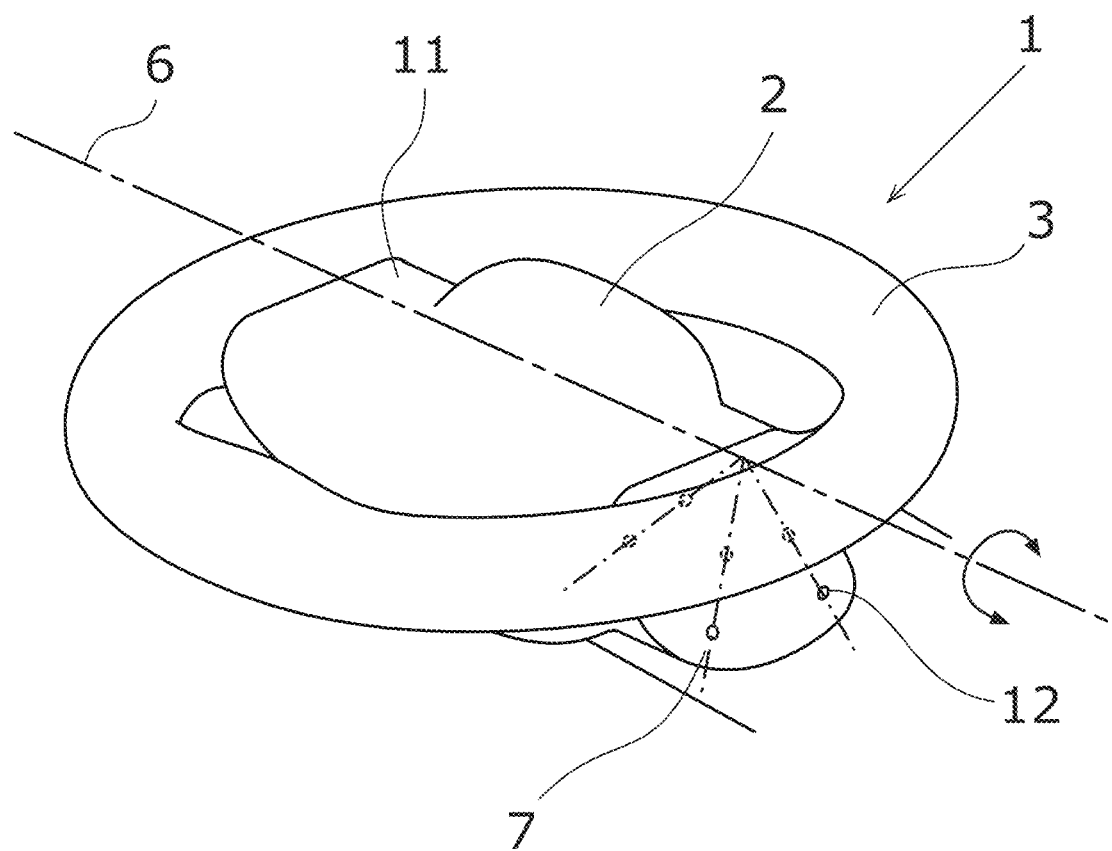
FIG. 2 is a schematic perspective view of the steering wheel shown in FIG. 1 with different sets of seats for producing various steering and non-steering positions.

FIG. 2 shows in detail how the corresponding seats 12 can be configured. In this example, two seats 12 which are configured as seat holes belong to a steering position 4 or non-steering position 5.

Figure 4:
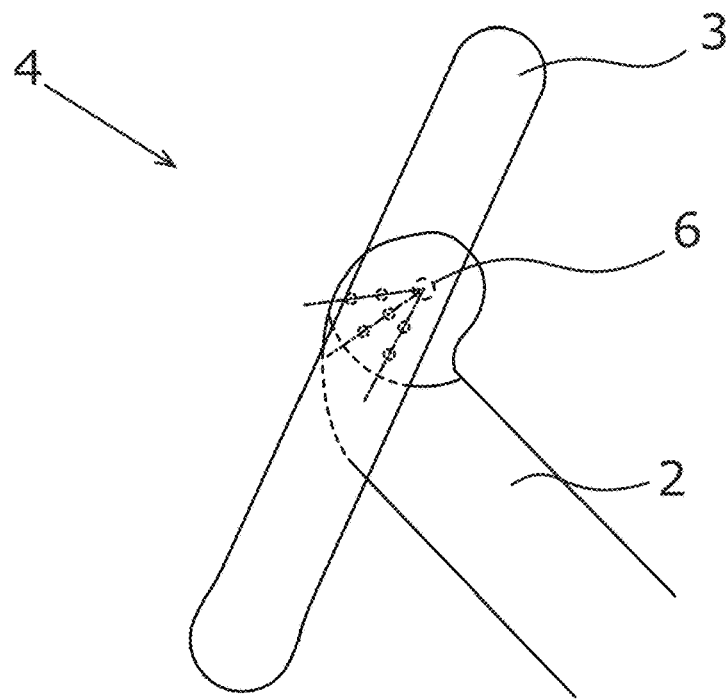
FIG. 4 is a schematic illustration of the steering wheel of FIG. 1 illustrated in an exemplary non-steering position.
Figure 3:
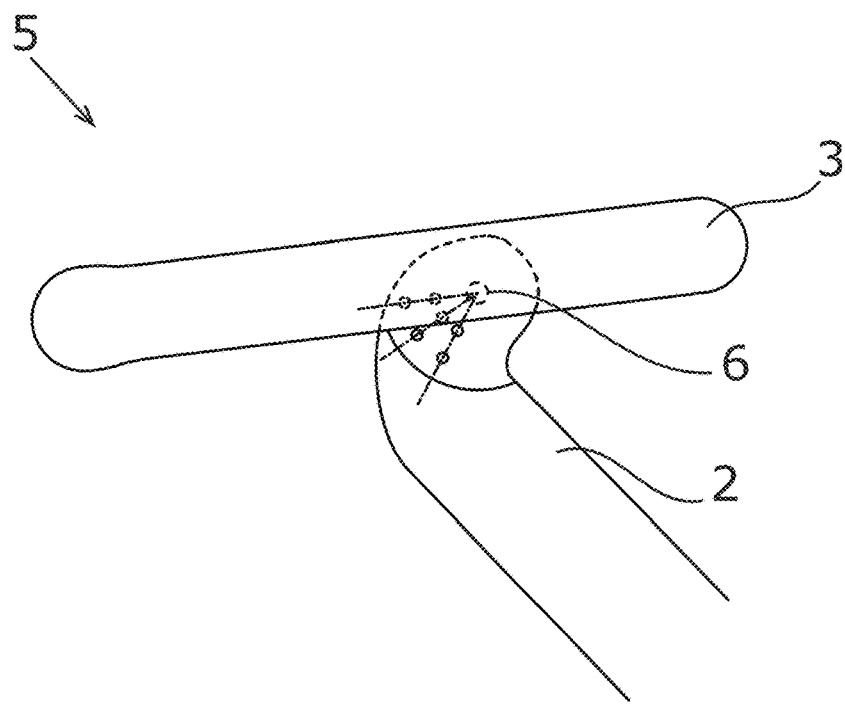
FIG. 3 is a schematic illustration of the steering wheel of FIG. 1, illustrated in an exemplary steering position.

FIG. 3 shows a steering position 4 and FIG. 4 shows a non-steering position 5. The rim 3 is in this instance rotated from the steering position 4 according to the illustration in FIG. 3 about the tilting axis 6 so that an almost horizontal orientation of the rim 3 is achieved according to the illustration in FIG. 4.

According to one aspect of the disclosure, the locking arrangement is fitted with spacing from the tilting axis in order to provide a large lever with respect to the tilting axis and consequently to enable secure fixing of the rim while a large number of steering wheel rim positions can be adjusted. Furthermore, the entire steering wheel is not tilted, but instead only the steering wheel rim is tilted. The mechanism for tilting is configured in such a manner in this instance that it can be accommodated inside the steering wheel rim by small modifications thereof. The remaining components, such as, for example, switches, selection lever and airbag, remain unchanged in this case.

Accordingly, the steering wheel for a vehicle includes a hub and a rim which extends around the hub, wherein the rim is pivotably supported between a steering position and at least one non-steering position about a tilting axis. The steering wheel has at least one releasable locking arrangement having a hub-side hub locking device and a rim-side rim locking device for blocking the pivoting by mutual engagement. The hub locking device and the rim locking device are configured to engage with each other with spacing from the tilting axis. The steering wheel has a central portion (hub) and a normally circumferential handle (rim) and can in principle be used in any vehicle, such as a wheeled vehicle or a transport vehicle. A large field of use is, for example, the automotive sector. The steering position may be adapted to the requirements of the driver by use of an additional displacement mechanism, in accordance with the size and the preferences for operating the vehicle. If the driver does not require the steering wheel, as is the case, for example, when at a standstill or when an autonomous driving mode is used, the steering wheel rim can be tilted away in order to allow the driver more freedom of movement. Several positions are conceivable. Inter alia, a position of the rim is also conceivable in which it is tilted upward in such a manner that a horizontal plane which extends through the rim and which in turn can be used as a table is produced. Should the steering wheel rim interfere in all positions, it is also conceivable to release it from the hub. In order to lock the rim, there is provided a locking arrangement whose components which are located in the rim can be combined to form a rim locking device and whose components which are located in the hub can be combined to form a hub locking device. In order to provide the most favorable lever relationships possible for the locking, the engagement locations thereof are located with spacing from the tilting axis.

In principle, the movable components of the locking arrangement may be distributed freely over the rim and the hub. One embodiment of the steering wheel, according to the disclosure, is characterized in that the movable components of the locking arrangement are arranged either only at the rim side or only at the hub side. As a result of the arrangement of the movable components in only one of the two components, the activation mechanism also has to be arranged in only one of the two components. The activation mechanism can thereby be accommodated in a very simple and user-friendly manner, for example, in the rim. However, it may also be advantageous to provide the movable components in the hub and in particular in arms of the hub.

Another aspect of the steering wheel is that the locking arrangement can be moved into a locking position and a release position, wherein a pre-tensioning of the locking arrangement moves it into the locking position. In order to increase the safety, for example, a pre-tensioned spring of the steering wheel or in particular of the locking arrangement is provided and moves the locking arrangement into the locking position. Only when a suitable external force is introduced is the locking arrangement released and releases the movement of the rim about the tilting axis. The rim can be moved substantially only until the external force is no longer active, otherwise the pre-tensioning of the spring again leads to the locking arrangement being moved into the locking position.

According to another aspect of the disclosure, the rim locking device can be changed in terms of its position relative to the tilting axis by rotating the rim about the tilting axis, while the hub locking device is fixed relative to the tilting axis. Since the rim is intended to be tilted, the rim locking device which is secured thereto is moved together with it. The hub locking device remains in its position in the same manner as the hub.

In principle, the tilting axis may in a technically advantageous context extend freely. According to one embodiment of the steering wheel, the tilting axis is orientated parallel with a plane which is defined by the rim. The tilting axis is a notional axis.

In particular, it may be the case that the tilting axis is located in the plane defined by the rim. In order to leave the shape of a standard steering wheel unaffected to the greatest possible extent, all the components may be accommodated in the region of the rim and the hub. As a result of this arrangement, all components can be provided as a whole within the steering wheel. As a result of additional fitted components, the tilting axis may be prevented from leaving the plane which is defined by the rim. Consequently, an additional joint which is arranged outside the steering wheel can be dispensed with. This saves space but substantially serves to provide less modification of the steering column so that many standard components can also be used in this instance.

In principle, the steering wheel may also have only one locking arrangement. In one embodiment, the steering wheel has two locking arrangements which are arranged in a substantially opposing manner with respect to the hub. In other words, the two locking arrangements are arranged opposite each other on a geometric center of the rim. It is advantageous, for example, to provide a locking arrangement on the right and left in each case since, in this manner, the steering wheel can be tilted symmetrically and above all in a stable manner. In this instance, the two locking arrangements share the tilting axis. In this manner, the rim can be folded away in an upward or downward direction symmetrically relative to a vertical axis.

According to another aspect of the disclosure, between the rim and the hub there is provided at least one separation face which extends substantially along an inner contour of the rim. The separation of the hub and rim may substantially along a notional inner contour of the rim. This contour may also be understood to be a notional outer contour of the hub. If there are, for example, connecting arms of the hub to the rim, the notional separation planes may also extend through them. At the forefront in this case is also an advantageous selection of the separation planes for the further use of as many of the standard fitted components as possible, such as the airbag and switches.

According to one embodiment, the hub contains a hub center and at least one arm which extends from the hub center to the rim. In particular, it may be the case that at least one separation face extends between the rim and the at least one arm.

In principle, shapes such as, for example, flattened lower and upper sides are conceivable for the rim. In principle, any closed shapes can be used as the rim. Individual handles as a rim would also be conceivable.

According to one specific example, the rim has a substantially circular shape. It is preferable for the shape to be closed. Consequently, the steering wheel preferably has a substantially closed rim.

According to the disclosure, the locking arrangement has a seat and a locking pin for blocking by engaging the locking pin with the seat. Preferably, the locking arrangement is configured to be released by moving the locking pin out of the seat. In this embodiment, the locking pin serves to block the movement of the rim. To this end, it engages in a seat (for example, a hole or an opening) and can be pulled out in order to release the locking arrangement. It may be the case that the hub locking device has the locking pin and the rim locking device has the seat. However, it is preferable for the rim locking device to have the locking pin and the hub locking device to have the seat. This may, on the one hand, facilitate the maintenance and, on the other hand, reduce the requirement for structural space in the hub, whereby the use of standard steering switches in the hub is facilitated.

It may be further preferable for the locking arrangement to have a plurality of seats and a plurality of locking pins for blocking by engaging the locking pins in respective seats.

The seat and the locking pin may in each case be conically shaped for play-free locking. For a high-quality feel of the steering wheel, it is advantageous for the rim to be securely fixed to the hub. This can be released by the locking pin being conically shaped and the seat also being shaped accordingly. A very small play is thereby produced between the locking pin and the seat in the locking position and the steering wheel rim can substantially no longer move relative to the hub.

The freedom of play of the locking system can be even further increased if a clamping action occurs during engagement between a respective locking pin and a corresponding seat. In one embodiment of the steering wheel, in the event of an engagement between the pin and seat a longitudinal pin axis of the pin differs from a longitudinal seat axis of the seat. Such a deviation may relate both to a position of the longitudinal pin axis and a position of the longitudinal seat axis and alternatively or additionally an orientation of the longitudinal pin axis and an orientation of the longitudinal seat axis. In other words, the pin then has an eccentric offset with respect to the seat. The described deviation results in the pin not completely filling the seat in the event of an engagement between the pin and seat, but instead a deformation of the pin is brought about and consequently a clamping action occurs. For this clamping action, a less strict tolerance is also sufficient.

It may be the case that the described clamping action is active only for one of the two pivot directions of the rim. In order to also ensure a freedom of play in both directions in such a case, there is preferably provision for the locking arrangement to have a stop for clamping engagement with the pin. In this instance, the orientation of a wall of the stop which is then in engagement with the pin deviates from the longitudinal pin axis.

According to one example of the steering wheel, the locking arrangement has a plurality, e.g., a large number, of sets of seats which define the steering positions and non-steering positions. Since the locking pins are moved relative to the seats when the rim is tilted, in the new position another set of seats in which the locking pins can engage is provided. This means that for each position of the rim an individual set of seats may be provided.

It should be appreciated that the locking arrangement can be released by any mechanism. According to one embodiment of the steering wheel, the steering wheel has a Bowden cable for releasing the locking arrangement. The Bowden cable may be configured to release the locking arrangement by moving the locking pins. In principle, the Bowden cable may be activated in any manner. In particular, the steering wheel may have a lever which can be manually activated in order to activate the Bowden cable. It may also be advantageous for the steering wheel to have a motor for activating the Bowden cable. In order to release and tilt the crown, the locking pins are pulled out of their seats.

According to one embodiment of the steering wheel, there is provision for the steering wheel to have a motor, such as, for example, an electric motor for activating the Bowden cable. In particular, the motor may be arranged in the rim. Preferably, the motor is arranged with spacing from the locking arrangement. The Bowden cable may be configured to redirect the force from an introduction location of the electric motor to the locking arrangement. The electric motor can thus pull the locking pins from the seats without being in the immediate vicinity thereof.

According to one embodiment of the steering wheel having two locking arrangements, the steering wheel has two Bowden cables for releasing a respective locking arrangement. Preferably, the steering wheel has a transmission for activating both Bowden cables by use of a common activation movement of the electric motor. In this manner, as a result of a single movement of the electric motor, both locking arrangements can be released. In particular, it may be the case that the transmission is configured to convert the common activation movement into two substantially opposing pulling movements. The transmission may have a disc for winding the two Bowden cables. The transmission may also have a substantially centrally supported lever for pulling on the two Bowden cables. The transmission may have a worm gear for rotating spindle shafts of the transmission which are configured to pull threaded sleeves of the Bowden cable.

Another embodiment of the steering wheel is that the steering wheel may include an activation mechanism which can be manually activated for releasing the locking arrangement. In particular, it may be the case that the activation mechanism has a plurality of activation handles which are substantially opposed with respect to the hub and which are activated substantially at the same time in order to release the locking arrangement. In other words, the activation mechanism is configured, when the activation handles are activated substantially at the same time, to release the locking arrangement. In addition to the electric motor mentioned above, the locking pins may also be pulled out manually by the driver. In this instance, for example, buttons are advantageous as activation handles and are pressed by the driver and transmit the force via a lever mechanism to the locking pins and thus pull them out of the seats. With only one button, there is the risk of the release mechanism being inadvertently activated. It is therefore recommended that a plurality of buttons which have to be pressed substantially at the same time be provided. Consequently, the risk of inadvertent activation is minimized.

It should be appreciated that the steering wheel according to the disclosure can also be used for sectors other than the automotive sector such as boats, for example.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A steering wheel for a vehicle, the steering wheel comprising:
   a hub;
   a rim which extends around the hub, wherein the rim is pivotably supported between a steering position and at least one non-steering position about a tilting axis;
   at least one releasable locking arrangement having a hub-side hub locking device and a rim-side rim locking device for blocking the pivoting by mutual engagement, wherein the hub locking device and the rim locking device are configured to engage with each other with spacing from the tilting axis;
   a Bowden cable for releasing the at least one releasable locking arrangement by moving locking pins; and
   a motor for operating the Bowden cable.

2. The steering wheel according to claim 1, wherein movable components of the at least one releasable locking arrangement are arranged either only at a rim side or only at a hub side.

3. The steering wheel according to claim 1, wherein the at least one releasable locking arrangement can be moved into a locking position and a release position, and wherein a pre-tensioning of the at least one releasable locking arrangement moves the at least one releasable locking arrangement into the locking position.

4. The steering wheel according to claim 1, wherein the rim locking device can be changed in position relative to the tilting axis by rotating the rim about the tilting axis, while the hub locking device is fixed relative to the tilting axis.

5. The steering wheel according to claim 1, further comprising at least one separation face, between the rim and the hub, wherein the at least one separation face extends substantially along an inner contour of the rim.

6. The steering wheel according to claim 1, wherein the hub contains a hub center and at least one arm which extends from the hub center to the rim.

7. The steering wheel according to claim 1, wherein the rim has a substantially circular closed shape.

8. The steering wheel according to claim 1, wherein the at least one releasable locking arrangement has a seat and one of the locking pins engages the seat for blocking movement of the steering wheel, and wherein the at least one releasable locking arrangement is configured to be released by moving the locking pin out of the seat.

9. A steering wheel for a vehicle, the steering wheel comprising:
   a hub;
   a rim which extends around the hub, wherein the rim is pivotably supported between a steering position and at least one non-steering position about a tilting axis;
   at least one releasable locking arrangement having a hub-side hub locking device and a rim-side rim locking device for blocking the pivoting by mutual engagement, wherein the hub locking device and the rim locking device are configured to engage with each other with spacing from the tilting axis, wherein the at least one releasable locking arrangement can be moved into a locking position and a release position, wherein a pre-tensioning of the at least one releasable locking arrangement moves the at least one releasable locking arrangement into the locking position, and wherein the rim locking device can be changed in position relative to the tilting axis by rotating the rim about the tilting axis, while the hub locking device is fixed relative to the tilting axis;
   a Bowden cable for releasing the at least one releasable locking arrangement by moving locking pins; and
   a motor for operating the Bowden cable.

10. The steering wheel according to claim 9, wherein the at least one releasable locking arrangement has a seat and one of the locking pins engages the seat for blocking movement of the steering wheel, and wherein the at least one releasable locking arrangement is configured to be released by moving the locking pin out of the seat.

* * * * *